United States Patent
Takahashi

(10) Patent No.: US 11,431,536 B2
(45) Date of Patent: Aug. 30, 2022

(54) RECEIVING DEVICE, RECEIVING METHOD, TRANSMITTING DEVICE, AND TRANSMITTING METHOD

(71) Applicant: Sony Group Corporation, Tokyo (JP)

(72) Inventor: Kazuyuki Takahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/296,493

(22) PCT Filed: Nov. 29, 2019

(86) PCT No.: PCT/JP2019/046728
§ 371 (c)(1),
(2) Date: May 24, 2021

(87) PCT Pub. No.: WO2020/121843
PCT Pub. Date: Jun. 18, 2020

(65) Prior Publication Data
US 2022/0052888 A1  Feb. 17, 2022

(30) Foreign Application Priority Data
Dec. 12, 2018  (JP) .............................. JP2018-232142

(51) Int. Cl.
*H04L 27/26* (2006.01)
*H04B 1/02* (2006.01)
*H04B 1/16* (2006.01)

(52) U.S. Cl.
CPC ........... *H04L 27/2601* (2013.01); *H04B 1/02* (2013.01); *H04B 1/16* (2013.01)

(58) Field of Classification Search
CPC ..... H04B 1/16; H04B 7/0413; H04L 27/2602; H04L 27/2601
See application file for complete search history.

(56) References Cited

U.S. PATENT DOCUMENTS

2012/0215889 A1* 8/2012 Iwata ............... H04N 21/64761
709/217
2012/0250800 A1 10/2012 Shankaraiah et al.
(Continued)

FOREIGN PATENT DOCUMENTS

| CN | 106230549 A | 12/2016 |
|----|-------------|---------|
| JP | 2018-101862 A | 6/2018 |
| TW | 201815117 A | 4/2018 |

OTHER PUBLICATIONS

International Search Report dated Jan. 28, 2020 in PCT/JP2019/046728 filed Nov. 29, 2019, 2 pages.
(Continued)

*Primary Examiner* — Khanh C Tran
(74) *Attorney, Agent, or Firm* — Oblon, McClelland, Maier & Neustadt, L.L.P.

(57) ABSTRACT

The present technology relates to a receiving device, a receiving method, a transmitting device, and a transmitting method that enable a more appropriate introduction of a new broadcasting scheme.

A receiving device is provided including a receiving unit that receives a transmission frame transmitted from a transmitting device, and a demodulation unit that performs demodulation processing on a data signal obtained from a transmission frame that has been received, on the basis of a transmission control signal obtained from the transmission frame that has been received, in which the transmission control signal includes time-division control information regarding time-division control, as control information according to introduction of a second scheme compatible with a first scheme, and the demodulation unit operates according to the time-division control information. The (Continued)

present technology can be applied to, for example, a transmission system compliant with a broadcasting scheme such as an ISDB-T scheme.

12 Claims, 11 Drawing Sheets

(56) References Cited

U.S. PATENT DOCUMENTS

| | | | | |
|---|---|---|---|---|
| 2014/0010329 A1* | 1/2014 | Ono | ............... | H04L 27/2628 |
| | | | | 375/295 |
| 2014/0294128 A1* | 10/2014 | Umeda | ............ | H04L 27/2675 |
| | | | | 375/346 |
| 2019/0149254 A1* | 5/2019 | Takahashi | ............ | H04B 1/16 |
| | | | | 375/130 |

OTHER PUBLICATIONS

Digital Video Broadcasting (DVB); "Frame structure channel coding and modulation for a second generation digital terrestrial television broadcasting system (DVB-T2)", ETSI EN 302 755, V1.4.1, ETSI, 2015, pp. 1-23, 59-75, sections 7.2.2 and 7.2.3.2, 228 total pages.

* cited by examiner

FIG. 2

TMCC CARRIER BIT ALLOCATION

| | |
|---|---|
| $B_0$ | DEMODULATION REFERENCE SIGNAL FOR TMCC SYMBOL |
| $B_1$ TO $B_{16}$ | SYNCHRONIZATION SIGNAL (w0=0011010111101110, w1=1100101000010001) |
| $B_{17}$ TO $B_{19}$ | SEGMENT FORMAT IDENTIFICATION (DIFFERENTIAL MODULATION 111, SYNCHRONOUS MODULATION 000) |
| $B_{20}$ TO $B_{121}$ | TMCC INFORMATION (102 BITS) |
| $B_{122}$ TO $B_{203}$ | PARITY BIT |

FIG. 3

TMCC INFORMATION

| BIT ALLOCATION | DESCRIPTION | | REMARKS |
|---|---|---|---|
| $B_{20}$ TO $B_{21}$ | SYSTEM IDENTIFICATION | | |
| $B_{22}$ TO $B_{25}$ | TRANSMISSION PARAMETER SWITCHING INDEX | | |
| $B_{26}$ | START CONTROL SIGNAL (START FLAG FOR EMERGENCY WARNING BROADCAST) | | |
| $B_{27}$ | CURRENT INFORMATION | PARTIAL RECEPTION FLAG | |
| $B_{28}$ TO $B_{40}$ | | A-LAYER TRANSMISSION PARAMETER INFORMATION | |
| $B_{41}$ TO $B_{53}$ | | B-LAYER TRANSMISSION PARAMETER INFORMATION | |
| $B_{54}$ TO $B_{66}$ | | C-LAYER TRANSMISSION PARAMETER INFORMATION | |
| $B_{67}$ | NEXT INFORMATION | PARTIAL RECEPTION FLAG | |
| $B_{68}$ TO $B_{80}$ | | A-LAYER TRANSMISSION PARAMETER INFORMATION | |
| $B_{81}$ TO $B_{93}$ | | B-LAYER TRANSMISSION PARAMETER INFORMATION | |
| $B_{94}$ TO $B_{106}$ | | C-LAYER TRANSMISSION PARAMETER INFORMATION | |
| $B_{107}$ TO $B_{109}$ | CONCATENATED TRANSMITTING PHASE CORRECTION AMOUNT [NOTE] | | ALL[1] |
| $B_{110}$ TO $B_{121}$ | UNDEFINED | | ALL[1] |

FIG. 4

INTRODUCTION OF NEW SCHEME

| $B_{110}$ | MEANING |
|---|---|
| 0 | HAS BEEN INTRODUCED |
| 1 | HAS NOT BEEN INTRODUCED |

FIG. 5

SWITCHING INDEX

| $B_{111}$ TO $B_{114}$ | MEANING |
|---|---|
| 1111 | NORMAL VALUE |
| 1110 | 15th FRAME BEFORE SWITCHING |
| 1101 | 14th FRAME BEFORE SWITCHING |
| 1100 | 13th FRAME BEFORE SWITCHING |
| 1011 | 12th FRAME BEFORE SWITCHING |
| 1010 | 11th FRAME BEFORE SWITCHING |
| 1001 | 10th FRAME BEFORE SWITCHING |
| 1000 | 9th FRAME BEFORE SWITCHING |
| 0111 | 8th FRAME BEFORE SWITCHING |
| 0110 | 7th FRAME BEFORE SWITCHING |
| 0101 | 6th FRAME BEFORE SWITCHING |
| 0100 | 5th FRAME BEFORE SWITCHING |
| 0011 | 4th FRAME BEFORE SWITCHING |
| 0010 | 3rd FRAME BEFORE SWITCHING |
| 0001 | 2nd FRAME BEFORE SWITCHING |
| 0000 | 1st FRAME BEFORE SWITCHING |

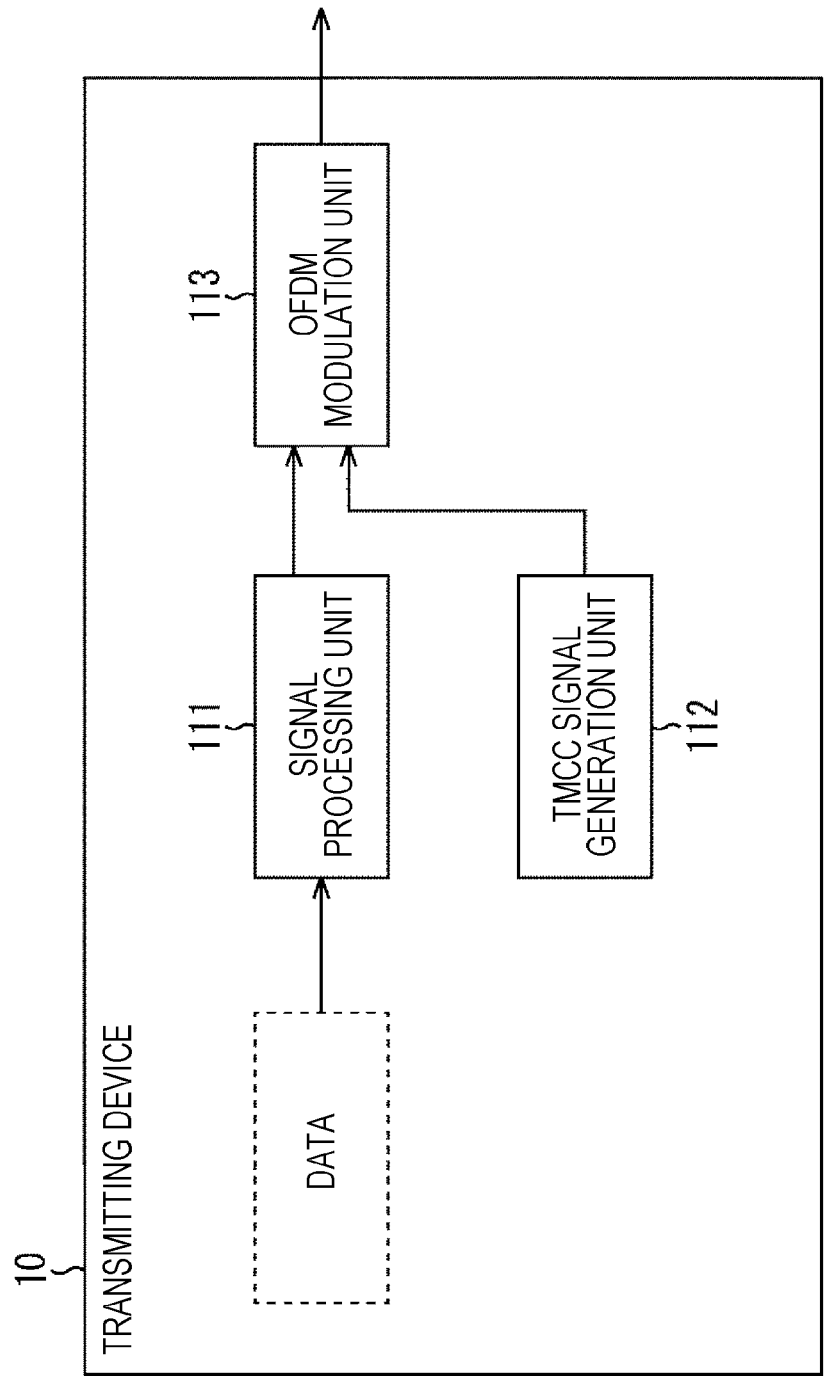

RECEIVING DEVICE, RECEIVING METHOD, TRANSMITTING DEVICE, AND TRANSMITTING METHOD

TECHNICAL FIELD

The present technology relates to a receiving device, a receiving method, a transmitting device, and a transmitting method, and more particularly to a receiving device, a receiving method, a transmitting device, and a transmitting method that enable a more appropriate introduction of a new broadcasting scheme.

BACKGROUND ART

For example, in Japan, studies are being conducted on the sophistication of digital terrestrial television broadcasting toward upgrading to the next generation, and various schemes are being studied (see, for example, Patent Document 1).

CITATION LIST

Patent Document

Patent Document 1: Japanese Patent Application Laid-Open No. 2018-101862

SUMMARY OF THE INVENTION

Problems to be Solved by the Invention

Incidentally, upon switching from an existing broadcasting scheme to a new broadcasting scheme compatible with the existing broadcasting scheme, it is required that the new broadcasting scheme be appropriately introduced.

The present technology has been made in view of such a situation, and enables more appropriate introduction of a new broadcasting scheme.

Solution to Problems

A receiving device according to one aspect of the present technology includes a receiving unit that receives a transmission frame transmitted from a transmitting device and a demodulation unit that performs demodulation processing on a data signal obtained from the transmission frame that has been received, on the basis of a transmission control signal obtained from the transmission frame that has been received, in which the transmission control signal includes time-division control information regarding time-division control, as control information according to introduction of a second scheme compatible with a first scheme, and the demodulation unit operates according to the time-division control information.

A receiving method according to one aspect of the present technology includes, by a receiving device including a receiving unit that receives a transmission frame transmitted from a transmitting device and a demodulation unit that performs demodulation processing on a data signal obtained from the transmission frame that has been received, on the basis of a transmission control signal obtained from the transmission frame that has been received, controlling the demodulation unit on the basis of time-division control information included in the transmission control signal, the time-division control information regarding time-division control, as control information according to introduction of a second scheme compatible with a first scheme.

In a receiving device and a receiving method according to one aspect of the present technology, a demodulation unit is controlled on the basis of time-division control information included in a transmission control signal, the time-division control information regarding time-division control as control information according to introduction of a second scheme compatible with a first scheme.

A transmitting device according to one aspect of the present technology includes a generation unit that generates a transmission control signal including time-division control information regarding time-division control, as control information according to introduction of a second scheme compatible with a first scheme, and a transmitting unit that transmits a transmission frame including the transmission control signal that has been generated.

A transmitting method according to one aspect of the present technology includes, by a transmitting device, generating a transmission control signal including time-division control information regarding time-division control, as control information according to introduction of a second scheme compatible with a first scheme, and by the transmitting device, transmitting a transmission frame including the transmission control signal that has been generated.

In a transmitting device and a transmitting method according to one aspect of the present technology, a transmission control signal including time-division control information regarding time-division control is generated as control information according to introduction of a second scheme compatible with a first scheme, and a transmission frame including the transmission control signal that has been generated is transmitted.

The receiving device and the transmitting device according to one aspect of the present technology may be independent devices, or may be internal blocks constituting one device.

BRIEF DESCRIPTION OF DRAWINGS

FIG. 2 is a diagram illustrating an example of TMCC carrier bit allocation.

FIG. 3 is a diagram illustrating details of TMCC information bit allocation.

FIG. 4 is a diagram illustrating an example of new-scheme introduction control information.

FIG. 5 is a diagram illustrating an example of time-division control information.

FIG. 6 is a block diagram illustrating a configuration example of a transmitting device.

MODE FOR CARRYING OUT THE INVENTION

Hereinafter, embodiments of the present technology will be described with reference to the drawings. Note that the description will be given in the following order.

1. Embodiment of Present Technology
2. Modifications
3. Configuration of Computer

1. Embodiment of Present Technology (Configuration Example of Transmission System)

Figure 1:
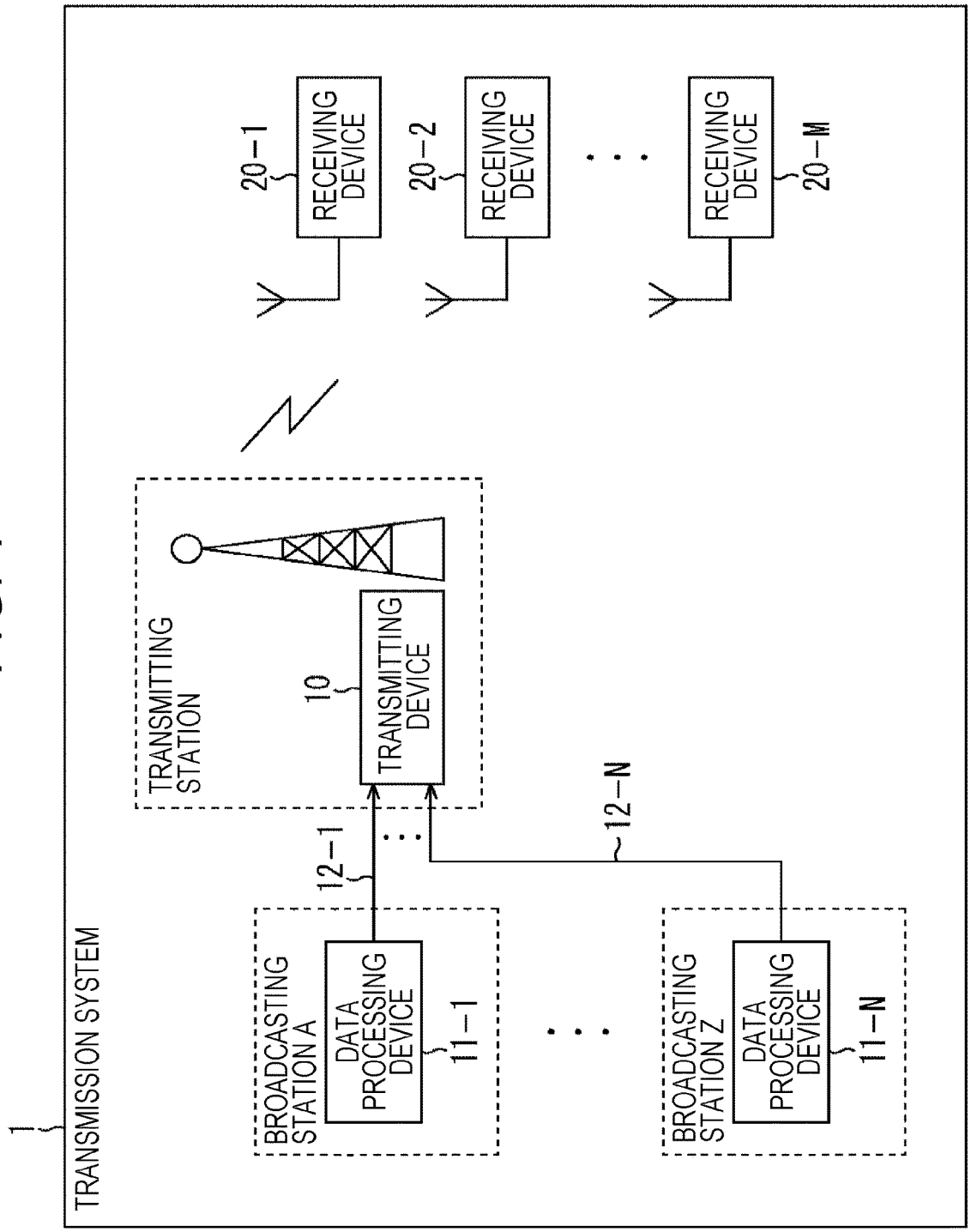
FIG. 1 is a diagram illustrating a configuration example of an embodiment of a transmission system to which the present technology is applied.

FIG. 1 is a diagram illustrating a configuration of an embodiment of a transmission system to which the present technology is applied. Note that a system refers to a logical collection of a plurality of devices.

In FIG. 1, a transmission system 1 is a system compliant with a broadcasting scheme such as digital terrestrial television broadcasting. The transmission system 1 includes data processing devices 11-1 to 11-N (N is an integer of 1 or more) installed in facilities related to respective broadcasting stations, a transmitting device 10 installed in a transmitting station, and receiving devices 20-1 to 20-M (M is an integer of 1 or more) owned by users, respectively.

Furthermore, in the transmission system 1, the data processing devices 11-1 to 11-N and the transmitting device 10 are connected through communication lines 12-1 to 12-N. Note that the communication lines 12-1 to 12-N can be dedicated lines, for example.

The data processing device 11-1 performs necessary processing such as encoding on data of broadcast content (for example, a broadcast program or the like) produced by a broadcasting station A, and transmits transmission data obtained as a result through the communication line 12-1 to the transmitting device 10.

Similarly in the data processing device 11-1, in the data processing devices 11-2 to 11-N, data of broadcast content produced by respective broadcasting stations such as a broadcasting station B and a broadcasting station Z are processed, and transmission data obtained as a result is transmitted to the transmitting device 10 through the communication lines 12-2 to 12-N.

The transmitting device 10 receives the transmission data transmitted from the data processing devices 11-1 to 11-N on the broadcasting-station side through the communication lines 12-1 to 12-N. The transmitting device 10 performs necessary processing such as coding or modulation on the transmission data from the data processing devices 11-1 to 11-N, and transmits broadcast signals obtained as a result from a transmission antenna installed at the transmitting station.

Therefore, the broadcast signal from the transmitting device 10 on the transmitting-station side is transmitted to each of the receiving devices 20-1 to 20-M by a radio waves in a predetermined frequency range.

Each of the receiving devices 20-1 to 20-M is configured, for example, as a fixed receiver such as a television receiver and a set top box (STB). The receiving devices 20-1 to 20-M are installed at home or the like of users, respectively.

The receiving device 20-1 receives a broadcast signal transmitted from the transmitting device 10 by a radio wave in a predetermined frequency range and performs necessary processing such as demodulation, decryption, or decoding, and therefore reproduces corresponding broadcast content (for example, a broadcast program or the like) according to channel selection operation by the user.

Similarly in the receiving device 20-1, in the receiving devices 20-2 to 20-M, broadcast signals from the transmitting device 10 are processed, and broadcast content corresponding to channel selection operation by the users is reproduced.

As described, in the receiving device 20, video of broadcast content is displayed on a display, and sound synchronized with the video is output from a speaker. Therefore, the user can view broadcast content such as a broadcast program.

Note that, in the transmission system 1, the M receiving devices 20 are mixture of receiving devices compliant with the existing broadcasting scheme (existing scheme) and receiving devices compatible with the new broadcasting scheme (new scheme). Therefore, in the following description, the receiving device 20 compliant with the existing scheme will be referred to as an existing-scheme receiving device 20L, and the receiving device 20 compliant with the new scheme will be referred to as a new-scheme receiving device 20N so as to make a distinction.

Moreover, since a receiving device 20 compliant with both the existing scheme and the new scheme is also assumed, such a receiving device 20 will be referred to as a dual-scheme receiving device 20D in the following description. However, in a case where there is no need to make a distinction in particular, the existing-scheme receiving device 20L, the new-scheme receiving device 20N, and the dual-scheme receiving device 20D are simply referred to as receiving devices 20.

Incidentally, in Japan, studies are being conducted aiming at upgrading digital terrestrial television broadcasting to the next generation. Here, as one of the transition methods from the existing scheme (ISDB-T scheme) to the new scheme (next-generation scheme of the ISDB-T scheme), introduction of a compatible new scheme using the frequency band of the existing scheme is being considered.

In the above-described case of introducing a new scheme compatible with the existing scheme, two phases are assumed. That is, a first phase is to introduce a new scheme while maintaining compatibility with the existing scheme, and the second phase is to stop the broadcasting service of the existing scheme and operate only the new scheme.

Then, upon introduction of a new scheme, it is required that the new scheme be properly introduced so that the new-scheme receiving device 20N or the dual-scheme receiving device 20D will be able to appropriately receive and process a broadcast signal of the new scheme without affecting operation of the existing-scheme receiving device 20L.

Therefore, in the present technology, as control information corresponding to introduction of a new scheme (second scheme) compatible with the existing scheme (first scheme), information regarding time-division control (hereinafter, also referred to as time-division control information) is included in a transmission control signal (TMCC signal), and the transmission control signal including the time-division control information is processed in the receiving device 20. As a result, the new scheme is more appropriately introduced.

Hereinafter, with reference to FIG. 2 to FIG. 10, a detailed description will be given of the present technology enabling a more appropriate introduction of a new scheme compatible with the existing scheme by using a transmission control signal including time-division control information upon introduction of the new scheme.

Incidentally, in Japan, Integrated Services Digital Broadcasting-Terrestrial (ISDB-T) scheme is adopted as an existing scheme for digital terrestrial television broadcasting.

In this ISDB-T scheme, the frequency band of a plurality of sub-carriers to which orthogonal frequency division multiplexing (OFDM) is applied, the plurality of sub-carriers being allocated to one channel (frequency band) is divided into 13 segments. OFDM is a type of digital modulation in which multiplexing is performed by forming a plurality of different sub-carriers (sub carriers) in a certain frequency band and transmitting the sub-carriers simultaneously.

Then, among the 13 segments, 12 segments are used for broadcasting for fixed receivers, and the remaining 1 segment is used for broadcasting for mobile receivers (so-called one-segment broadcasting). Furthermore, data for broadcasting is transmitted simultaneously in the 13 segments.

Note that one channel (frequency band) is divided into 13 segments, and here, one channel can include a maximum of three layers. These three layers can be, for example, an A layer including one segment, a B layer including six segments, and a C layer including six segments. However, the number of segments in each layer can be set to any number as long as the total of the segments of the three layers (A layer, B layer, and C layer) does not exceed 13 segments.

Furthermore, in the ISDB-T scheme, transmission multiplexing configuration control (TMCC) is defined as a transmission control signal. This TMCC signal includes information such as transmission parameters such as the modulation scheme of each layer and an error correction coding rate of each layer.

(Example of TMCC Signal)

FIG. 2 illustrates an example of TMCC carrier bit allocation.

FIG. 2 indicates that, among 204 bits $B_0$ to $B_{203}$ of the TMCC carrier, bit $B_0$ is allocated to a demodulation reference signal for a TMCC symbol, bits $B_1$ to $B_{16}$ are allocated to synchronization signals, bits $B_{17}$ to $B_{19}$ are allocated to segment format identification, bits $B_{20}$ to $B_{121}$ are allocated to TMCC information, and bits $B_{122}$ to $B_{203}$ are allocated to parity bits.

FIG. 3 illustrates details of bits $B_{20}$ to $B_{121}$ of the TMCC information in FIG. 2.

Among bits $B_{20}$ to $B_{121}$ of the TMCC information, bits $B_{20}$ to $B_{21}$ are allocated to system identification, bits $B_{22}$ to $B_{25}$ are allocated to transmission parameter switching indexes, bit $B_{26}$ is allocated to a start control signal, bits $B_{27}$ to $B_{66}$ are allocated to current information, bits $B_{67}$ to $B_{106}$ are allocated to next information, bits $B_{107}$ to $B_{109}$ are allocated to a concatenated transmitting phase correction amount, and bits $B_{110}$ to $B_{121}$ are undefined.

The TMCC signal has the above-described configuration.

(Example of TMCC Signal to which Present Technology is Applied)

In the present technology, new-scheme introduction control information and time-division control information are added to undefined bits (reserve bits) of the TMCC information included in the TMCC signal.

FIG. 4 illustrates an example of the new-scheme introduction control information.

In FIG. 4, among the undefined bits of the TMCC information, one bit of bit $B_{110}$ is allocated to the new-scheme introduction control information.

Here, a case where '0' is specified as bit $B_{110}$ of TMCC information indicates that a new scheme compatible with the existing scheme has been introduced. In contrast, a case where '1' is specified as bit $B_{110}$ of TMCC information indicates that a new scheme compatible with the existing scheme has not been introduced.

FIG. 5 illustrates an example of time-division control information.

In FIG. 5, among the undefined bits of the TMCC information in FIG. 3, four bits of bits $B_{111}$ to $B_{114}$ are allocated to the time-division control information.

This time-division control information includes information for each unit of a transmission frame such as an OFDM frame (time-division information divided in units of fixed transmission frames (units of time)). For example, the time-division control information can include information regarding an index (switching index) upon switching from the existing scheme to the new scheme.

Specifically, as the switching index, for example, as illustrated in FIG. 5, information regarding the number of transmission frames until switching from the existing scheme to the new scheme can be included.

That is, in FIG. 5, a case where '1111' is specified as the 4-bit value of bits $B_{111}$ to $B_{114}$ indicates that the value is a normal value. Furthermore, a case where '1110' is specified as the 4-bit value of bits $B_{111}$ to $B_{114}$ indicates that it is a fifteenth frame before switching, and a case where '1101' is specified indicates that it is a fourteenth frame before switching.

Hereinafter, similarly, in a case where '1100', '1011', '1010', '1001', '1000', '0111', '0110', '0101', '0100', '0011', and '0010' are sequentially specified as 4-bit values of bits $B_{111}$ to $B_{114}$, the number of frames before switching is decremented by one frame in this order from a thirteenth frame before switching, and frames between the thirteenth frame before switching to a third frame before switching inclusive are illustrated in descending order as the numbers of frames before switching.

Then, a case where '0001' is specified as the 4-bit value of bits $B_{111}$ to $B_{114}$ indicates that it is a second frame before switching, and a case where '0000' is specified indicates that it is a first frame before switching.

As described above, in the present technology, new-scheme introduction control information and time-division control information are added to the undefined bits (reserve bits) of TMCC information included in a TMCC signal.

As described, by newly defining new-scheme introduction control information (bit $B_{110}$) and time-division control information (bits $B_{111}$ to $B_{114}$) in TMCC information, the receiving device 20 can determine whether or not a new scheme has been introduced into an existing scheme on the basis of new-scheme introduction control information. Furthermore, the receiving device 20 can perform processing according to time-division control information in a case where it is determined that the new scheme has been introduced into the existing scheme.

Note that in FIG. 5, the 4-bit values of bits $B_{111}$ to $B_{114}$ represent 15 frames before as the number of transmission frames until switching from the existing scheme to the new scheme; however, the number of frames is an example. The number of frames may be more or less than 15 frames depending on the environment, the capacity, and the like of the device. Then, here, the bit length to be allocated is determined according to the number of frames to be represented. For example, in addition to four bits, undefined bits of TMCC information may be used to allocate bits of three or less bits or bits of five or more bits.

Furthermore, in the above description, an example in which new-scheme introduction control information and time-division control information are added as TMCC information has been explained; however, the receiving device 20 can specify switching from the existing scheme to the new scheme by using only time-division control information. Therefore, it is not always necessary to add new-scheme introduction control information.

(Configuration of Transmitting Device)

FIG. 6 illustrates an example of the configuration of the transmitting device 10 in FIG. 1.

In FIG. 6, the transmitting device 10 includes a signal processing unit 111, a TMCC signal generation unit 112, and an OFDM modulation unit 113.

The signal processing unit 111 performs signal processing on broadcast content data input therein as transmission data, and supplies the data signal obtained as a result to the OFDM modulation unit 113. This signal processing includes, for example, forward error correction coding modulation processing and modulation processing such as time interleaving or frequency interleaving.

The TMCC signal generation unit 112 generates a TMCC signal as a transmission control signal and supplies the TMCC signal to the OFDM modulation unit 113. As the TMCC information included in the TMCC signal, for example, in addition to the TMCC information illustrated in FIG. 3, time-division control information using an undefined bit or the like can be included.

The OFDM modulation unit 113 is (part of) a transmitting unit that performs processing regarding an OFDM frame as a transmission frame. The OFDM modulation unit 113 performs OFDM modulation processing on the data signal supplied from the signal processing unit 111 and the TMCC signal supplied from the TMCC signal generation unit 112, and transmits (sends out) as a broadcast signal the modulated signal obtained as a result through a transmitting antenna (not illustrated).

The OFDM modulation processing includes, for example, configuring an OFDM frame, an inverse fast Fourier transform (IFFT) of converting a signal in the frequency domain to a signal in the time domain, processing of adding a guard interval (GI), and the like.

The transmitting device 10 is configured as described above.

Note that the existing scheme and the new scheme are not particularly distinguished here for the sake of simplification of description, and the signal processing unit 111, the TMCC signal generation unit 112, and the OFDM modulation unit 113 are compatible with both the schemes.

For example, in the existing scheme, as broadcast content, 2K content corresponding to 2K video is processed and the broadcast signal (2K broadcast signal) is sent out, while in the new scheme, as broadcast content, 4K content corresponding to 4K video is processed and the broadcast signal (4K broadcast signal) is sent out.

Specifically, for example, in the above-described first phase, since the new scheme is introduced while maintaining compatibility with the existing scheme, a 2K broadcast signal and a 4K broadcast signal are sent out from the transmitting device 10. Furthermore, in the above-described second phase, since the broadcasting service of the existing scheme is stopped and only operation of the new scheme is performed, only a 4K broadcasting signal is transmitted from the transmitting device 10.

(Configuration of Receiving Device)

Figure 7:
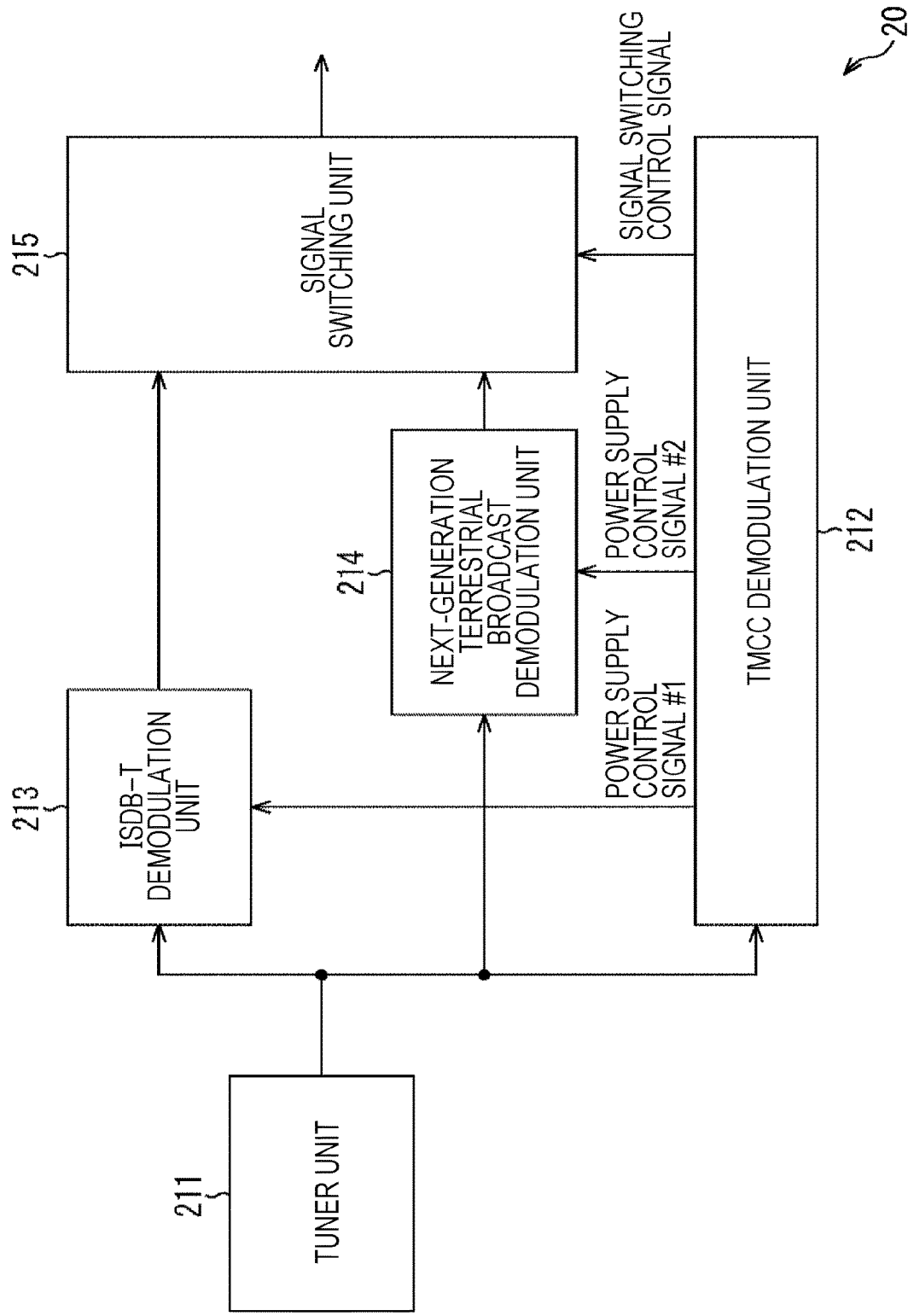
FIG. 7 is a block diagram illustrating a configuration example of a receiving device.

FIG. 7 illustrates an example of the configuration of the receiving device 20 of FIG. 1.

In FIG. 7, the receiving device 20 includes a tuner unit 211, a TMCC demodulation unit 212, an ISDB-T demodulation unit 213, a next-generation terrestrial broadcast demodulation unit 214, and a signal switching unit 215.

The tuner unit 211 is (part of) a receiving unit that selects a predetermined frequency band of a broadcast signal received via a receiving antenna (not illustrated). The tuner unit 211 supplies the broadcast signal of the selected frequency band to the TMCC demodulation unit 212, the ISDB-T demodulation unit 213, and the next-generation terrestrial broadcast demodulation unit 214.

Note that in the tuner unit 211, as OFDM demodulation processing, for example, processing of removing the guard interval (GI), fast Fourier transform (FFT) of converting a signal in the time domain into a signal in the frequency domain, processing of demodulating the OFDM frame, or the like is performed. However, the OFDM demodulation processing may be performed by a demodulation circuit such as the ISDB-T demodulation unit 213 or the next-generation terrestrial broadcast demodulation unit 214.

The TMCC demodulation unit 212 performs TMCC demodulation processing on the OFDM frame supplied from the tuner unit 211 to acquire a TMCC signal. The TMCC demodulation unit 212 supplies the TMCC information included in the TMCC signal that has been acquired to at least one demodulation unit out of the ISDB-T demodulation unit 213 and the next-generation terrestrial broadcast demodulation unit 214.

Furthermore, on the basis of TMCC information included in the TMCC signal that has been acquired and information such as (type) of the broadcast signal being received, the TMCC demodulation unit 212 supplies a power supply control signal #1 to the ISDB-T demodulation unit 213, a power supply control signal #2 to the next-generation terrestrial broadcast demodulation unit 214, and a signal switching control signal to the signal switching unit 215.

Here, the power supply control signal #1 is a control signal for controlling power supplied from a power supply unit (not illustrated) to the ISDB-T demodulation unit 213. For example, the power supply control signal #1 is either an H-level or L-level signal. In a case where the power supply control signal #1 is at H level, power is supplied to the ISDB-T demodulation unit 213, and in a case where the power supply control signal #1 is at L level, power supply to the ISDB-T demodulation unit 213 is stopped.

Furthermore, the power supply control signal #2 is a control signal for controlling power to be supplied from the power supply unit to the next-generation terrestrial broadcast demodulation unit 214. For example, the power supply control signal #2 is either an H-level or L-level signal. In a case where the power supply control signal #2 is at H level, power is supplied to the next-generation terrestrial broadcast demodulation unit 214, and in a case where the power supply control signal #2 is at L level, power supply to the next-generation terrestrial broadcast demodulation unit 214 is stopped.

The signal switching control signal is a control signal for switching output of the signal switching unit 215 to an output signal from the ISDB-T demodulation unit 213 or to an output signal from the next-generation terrestrial broadcast demodulation unit 214. For example, in a case where the signal switching control signal is at H level, the output signal from the next-generation terrestrial broadcast demodulation unit 214 is output, and in a case where the signal switching control signal is at L level, an output signal from the ISDB-T demodulation unit 213 is output.

The ISDB-T demodulation unit 213 is a demodulation circuit (for example, a demodulation LSI) compliant with the specifications of the ISDB-T scheme as an existing scheme.

An OFDM frame from the tuner unit 211 and TMCC information from the TMCC demodulation unit 212 are supplied to the ISDB-T demodulation unit 213. The ISDB-T demodulation unit 213 performs demodulation processing on a data signal obtained from the OFDM frame on the basis of the TMCC information, and supplies the output signal obtained as a result to the signal switching unit 215.

Furthermore, in the ISDB-T demodulation unit 213, power supplied from the power supply unit is controlled on the basis of the power supply control signal #1 supplied from the TMCC demodulation unit 212.

The next-generation terrestrial broadcast demodulation unit 214 is a demodulation circuit (for example, a demodulation LSI) compliant with the specifications of the next-generation terrestrial broadcasting scheme as a new scheme.

The OFDM frame from the tuner unit 211 and the TMCC information from the TMCC demodulation unit 212 are supplied to the next-generation terrestrial broadcast demodulation unit 214. The next-generation terrestrial broadcast demodulation unit 214 performs demodulation processing on a data signal obtained from the OFDM frame on the basis of the TMCC information, and supplies the output signal obtained as a result to the signal switching unit 215.

Furthermore, in the next-generation terrestrial broadcast demodulation unit 214, power supplied from the power supply unit is controlled on the basis of the power supply control signal #2 supplied from the TMCC demodulation unit 212.

Note that the demodulation processing performed by the ISDB-T demodulation unit 213 and the next-generation terrestrial broadcast demodulation unit 214 includes, for example, frequency deinterleaving, time deinterleaving, forward error correction demodulation/decoding processing, or the like.

The signal switching unit 215 switches between the output signal input from the ISDB-T demodulation unit 213 and the output signal input from the next-generation terrestrial broadcast demodulation unit 214 on the basis of the signal switching control signal supplied from the TMCC demodulation unit 212, and outputs one of the output signals to the subsequent unit (for example, a decoder or the like).

The receiving device 20 is configured as described above.

Note that since the receiving device 20 illustrated in FIG. 7 has the ISDB-T demodulation unit 213 and the next-generation terrestrial broadcast demodulation unit 214 as demodulation circuits, it can be said that the receiving device 20 is a dual-scheme receiving device 20D. Furthermore, although not illustrated in particular, the existing-scheme receiving device 20L has only the ISDB-T demodulation unit 213 as a demodulation circuit, and the new-scheme receiving device 20N has only the next-generation terrestrial broadcast demodulation unit 214 as a demodulation circuit.

For example, in the above-described first phase, the new scheme is introduced while maintaining compatibility with the existing scheme. Therefore, a 2K broadcast signal and a 4K broadcast signal will be sent out from the transmitting device 10. The existing-scheme receiving device 20L receives the 2K broadcast signal and displays 2K video according to 2K content, while the new-scheme receiving device 20N receives the 4K broadcast signal and displays 4K video corresponding to 4K content.

Furthermore, in the above-described second phase, the broadcasting service of the existing scheme is stopped and only operation of the new scheme is performed. Therefore, only the 4K broadcast signal is sent out from the transmitting device 10, and the new-scheme receiving device 20N receives the 4K broadcast signal and displays 4K video according to 4K content. Note that it is assumed that the existing-scheme receiving device 20L is not adaptive to a 4K broadcast signal.

In the following description, as the receiving device 20, the dual-scheme receiving device 20D illustrated in FIG. 7 will be described as an example.

Here, operation of the receiving device 20 (dual-scheme receiving device 20D) upon introduction of the new scheme will be described with reference to the timing chart in FIG. 8.

Figure 8:
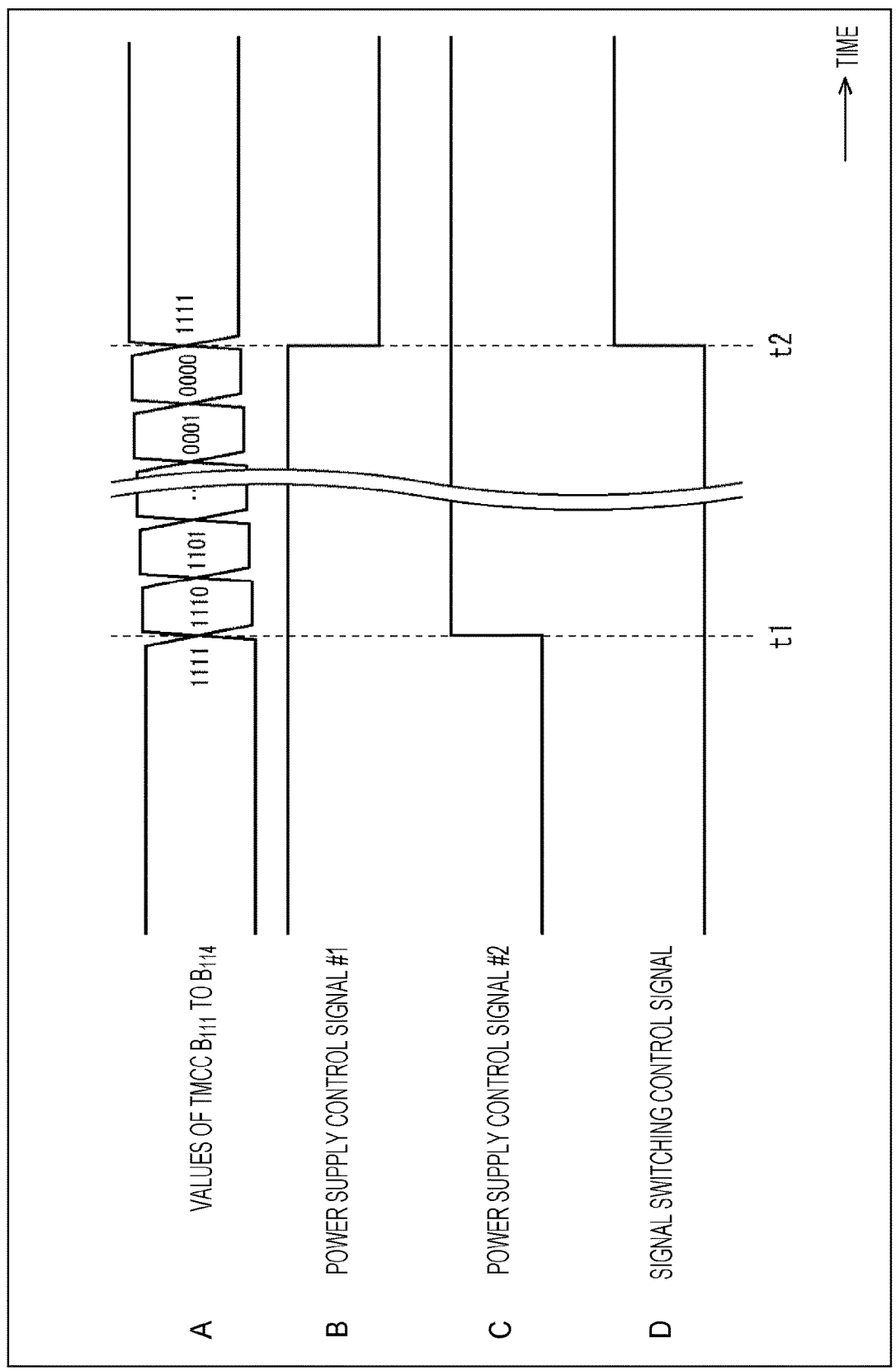
FIG. 8 is a timing chart illustrating operation of the receiving device upon introduction of a new scheme.

A of FIG. 8 illustrates time-division control information included in TMCC information, that is, a timing chart of 4-bit values of bits $B_{111}$ to $B_{114}$. Furthermore, B and C in FIG. 8 illustrate timing charts of the power supply control signal #1 and the power supply control signal #2, respectively. Moreover, D in FIG. 8 illustrates a timing chart of the signal switching control signal. Note that in FIG. 8, it is assumed that the direction of time is the left-to-right direction.

In the time before a time point t1, the 4-bit value of bits $B_{111}$ to $B_{114}$ is '1111', that is, a normal value. Furthermore, the power supply control signal #1 is at H level, the power supply control signal #2 is at L level, and the signal switching control signal is at L level.

At this time, in the dual-scheme receiving device 20D, a broadcast signal (2K broadcast signal) of the ISDB-T scheme, which is the existing scheme, is received, demodulation processing is performed by the ISDB-T demodulation unit 213, and an output signal (2K signal) compliant with the ISDB-T scheme is output via the signal switching unit 215. Therefore, the dual-scheme receiving device 20D displays 2K video corresponding to 2K content.

Thereafter, when the time point t1 comes, the 4-bit value of bits $B_{111}$ to $B_{114}$ changes from '1111' to '1110', which indicates that it is a fourteenth frame before switching from the ISDB-T scheme to the next-generation terrestrial broadcasting scheme.

At this time, the power supply control signal #2 changes from L level to H level. Therefore, in the dual-scheme receiving device 20D, power supply to the next-generation terrestrial broadcast demodulation unit 214 is started, the next-generation terrestrial broadcast demodulation unit 214 starts operating, and thus demodulation processing can be performed on a broadcast signal (4K broadcast signal) of the next-generation terrestrial broadcasting scheme, which is the new scheme.

Subsequently, the 4-bit value of bits $B_{111}$ to $B_{114}$ changes in the order of '1101', '1100', '1011', '1010', '1001', '1000', '0111', '0110', '0101', '0100', '0011', '0010', and '0001', and thus the number of frames before switching changes in the order of 13, 12, 11, 10, 9, 8, 7, 6, 5, 4, 3, and 2, correspondingly. Then, when the 4-bit value of bits $B_{111}$ to $B_{114}$ becomes '0000', the number of frames before switching from the ISDB-T scheme to the next-generation terrestrial broadcasting scheme becomes one.

Then, when a time point t2 has come, the 4-bit value of bits $B_{111}$ to $B_{114}$ changes from '0000' to '1111', which indicates that the ISDB-T scheme has been switched to the next-generation terrestrial broadcasting scheme. At this time, the signal switching control signal changes from L level to H level, and the power supply control signal #1 changes from H level to L level.

Therefore, in the dual-scheme receiving device 20D, output of the signal switching unit 215 is switched from the output signal from the ISDB-T demodulation unit 213 to the output signal from the next-generation terrestrial broadcast demodulation unit 214, and in addition, power supply to the ISDB-T demodulation unit 213 is stopped and the ISDB-T demodulation unit 213 stops operating.

Note that after switching (time after time point t2), the 4-bit value of bits $B_{111}$ to $B_{114}$ becomes '1111', that is, the normal value. Furthermore, the power supply control signal #1 is at L level, the power supply control signal #2 is at H level, and the signal switching control signal is at H level.

At this time, in the dual-scheme receiving device 20D, a broadcast signal (4K broadcast signal) of the next-generation terrestrial broadcasting scheme, which is a new scheme, is received, demodulation processing is performed by the next-generation terrestrial broadcast demodulation unit 214, and an output signal (4K signal) compliant with the next-generation terrestrial broadcasting scheme is output via the signal switching unit 215. Therefore, the dual-scheme receiving device 20D displays 4K video corresponding to 4K content.

As described above, in a case where a new scheme is introduced to the existing scheme, for example, the following effects can be obtained by performing operation illustrated in the timing chart of FIG. 8 in the dual-scheme receiving device 20D.

That is, first, the signal switching unit 215 can switch between the ISDB-T demodulation unit 213 and the next-generation terrestrial broadcast demodulation unit 214 with the accuracy in units of transmission frames on the basis of a signal switching control signal. As a result, for example, even in a case where the modulation scheme is switched between the existing scheme and the new scheme, in the dual-scheme receiving device 20D, switching between a demodulation circuit compliant with the specifications (demodulation scheme) of the existing scheme and a demodulation circuit compliant with the specifications (demodulation scheme) of the new scheme can be performed at high speed.

Second, by controlling power supply to the ISDB-T demodulation unit 213 on the basis of the power supply control signal #1 and controlling power supply to the next-generation terrestrial broadcast demodulation unit 214 on the basis of the power supply control signal #2, it is possible to minimize the period during which the ISDB-T demodulation unit 213 and the next-generation terrestrial broadcast demodulation unit 214 operate simultaneously. As a result, the dual-scheme receiving device 20D can reduce overall power consumption, for example, upon introduction of the new scheme.

Figure 9:
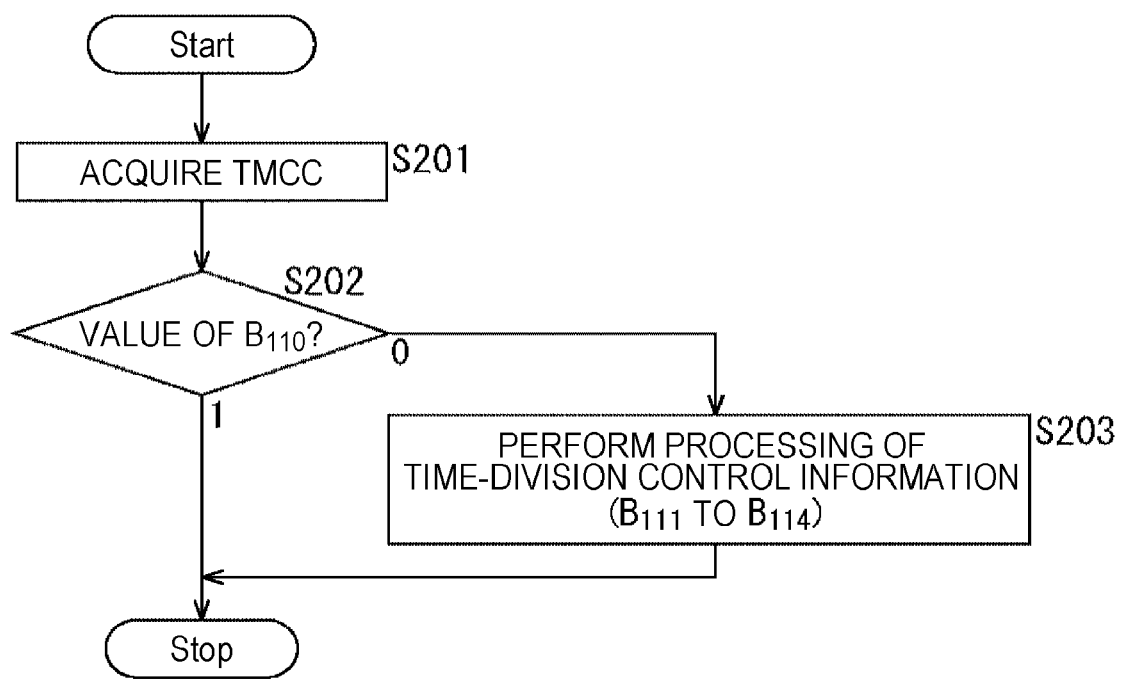
FIG. 9 is a flowchart illustrating a flow of reception processing.
Figure 10:
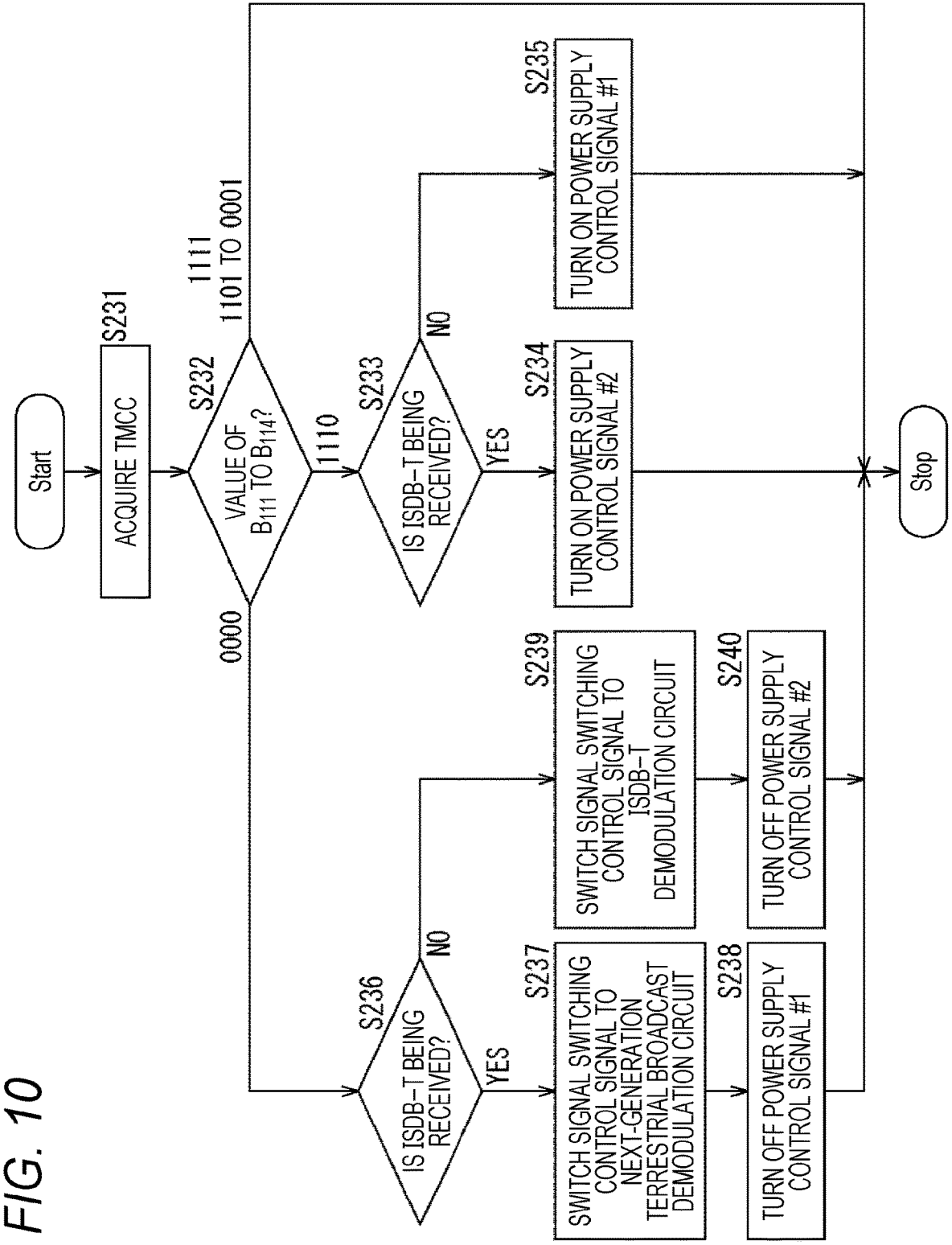
FIG. 10 is a flowchart illustrating a flow of the reception processing.

Next, the flow of receiving processing executed by the dual-scheme receiving device 20D will be described with reference to the flowcharts of FIGS. 9 and 10.

Here, first, an example of the operation of the dual-scheme receiving device 20D corresponding to the new-scheme introduction control information (bit $B_{110}$) included in the TMCC information will be described with reference to the flowchart of FIG. 9.

In step S201, the TMCC demodulation unit 212 acquires TMCC information (including new-scheme introduction control information) from the OFDM demodulation result from the tuner unit 211. Then, the subsequent processing is executed according to the new-scheme introduction control information included in the TMCC information.

In the determination process of step S202, the value of bit $B_{110}$ is determined. In a case where it is determined in the determination process of step S202 that the value of bit $B_{110}$ as the new-scheme introduction control information is '0', that is, in a case where it is determined that the new scheme has been introduced, the process proceeds to step S203.

In step S203, processing of time-division control information is executed by the TMCC demodulation unit 212 to the signal switching unit 215. In the processing of the time-division control information, for example, operation illustrated in the timing chart in FIG. 8 described above is performed on the basis of the time-division control information (4-bit value of bits $B_{111}$ to $B_{114}$).

Note that in a case where it is determined in the determination process of step S202 that the value of bit $B_{110}$ is '1', that is, it is determined that the new scheme has not been introduced, the process of step S203 is skipped.

As described, the dual-scheme receiving device 20D can determine whether or not a new scheme has been introduced into the existing scheme on the basis of the new-scheme introduction control information (bit $B_{110}$), and can execute processing according to the determination result.

Next, with reference to the flowchart of FIG. 10, an example of the process corresponding to the process of step S203 of FIG. 9, that is, operation of the dual-scheme receiving device 20D corresponding to the time-division control information (values of bits $B_{111}$ to $B_{114}$) included in the TMCC information will be described.

It is noted that in this example, a case where the existing scheme is the ISDB-T scheme and the new scheme is the next-generation terrestrial broadcasting scheme will be described as an example.

In step S231, the TMCC demodulation unit 212 acquires TMCC information (including time-division control information) from the OFDM demodulation result from the tuner unit 211. Then, the processes of steps S232 to 240 are executed according to the time-division control information (4-bit value of bits $B_{111}$ to $B_{114}$) included in the TMCC information.

In the determination process of step S232, it is determined whether the 4-bit value of bits $B_{111}$ to $B_{114}$ is '0000', '1110', '1111' or any one of '1101' to '0001'.

In a case where it is determined in the determination process of step S232 that the 4-bit value of bits $B_{111}$ to $B_{114}$ is '1110', that is, it is a fifteenth frame before switching, the process proceeds to step S233. In the determination process of step S233, it is determined whether or not an ISDB-T scheme broadcast signal is being received.

In a case where it is determined in the determination process of step S233 that the broadcast signal of the ISDB-T scheme is being received ("YES" in S233), the process proceeds to step S234. Then, the TMCC demodulation unit 212 turns on the power supply control signal #2 for the next-generation terrestrial broadcast demodulation unit 214, that is, supplies an H-level signal (S234).

As described, in a case where the 4-bit value of bits $B_{111}$ to $B_{114}$ is '1110' and a broadcast signal of the ISDB-T scheme is being received, the next-generation terrestrial broadcast demodulation unit 214 is started together with the ISDB-T demodulation unit 213.

In contrast, in a case where it is determined in the determination process of step S233 that the broadcast signal of the ISDB-T scheme is not being received ("NO" in S233), the process proceeds to step S235. Then, the TMCC demodulation unit 212 turns on the power supply control signal #2 for the ISDB-T demodulation unit 213, that is, supplies an H level signal (S235).

As described, in a case where the 4-bit value of bits $B_{111}$ to $B_{114}$ is '1110' and a broadcast signal of the ISDB-T scheme is not being received, the ISDB-T demodulation unit 213 is started together with the next-generation terrestrial broadcast demodulation unit 214.

If the process of step S234 or S235 is completed, processing is stopped until the next TMCC information is acquired. Then, in a case where the next TMCC information is acquired, the process illustrated in FIG. 10 is executed again.

Note that in a case where it is determined in the determination process of step S232 that the 4-bit value of bits $B_{111}$ to $B_{114}$ is any of '1101' to '0001', that is, it is between a fourteenth frame before switching and a second frame before switching, processing is stopped until the next TMCC information is acquired.

Then, in a case where it is determined in the determination process of step S232 that the 4-bit value of bits $B_{111}$ to $B_{114}$ is '0000', that is, a first frame before switching, the process proceeds to step S236. In the determination process of step S236, it is determined whether or not the broadcast signal of the ISDB-T scheme is being received.

In a case where it is determined in the determination process of step S236 that the broadcast signal of the ISDB-T scheme is being received ("YES" in S236), the process proceeds to step S237, and the processes of steps S237 and S238 are executed.

That is, the TMCC demodulation unit 212 supplies a signal for switching to input from the next-generation terrestrial broadcast demodulation unit 214 as a signal switching control signal for the signal switching unit 215 (S237). Furthermore, the TMCC demodulation unit 212 turns off the power supply control signal #1 for the ISDB-T demodulation unit 213, that is, supplies an L-level signal (S238).

As described, in a case where the 4-bit value of bits $B_{111}$ to $B_{114}$ is '0000' and the broadcast signal of the ISDB-T scheme is being received, since the next-generation terrestrial broadcast demodulation unit 214 has been started (S234) together with the ISDB-T demodulation unit 213, switching to the output signal from the next-generation terrestrial broadcast demodulation unit 214 is performed and the ISDB-T demodulation unit 213 is stopped.

In contrast, in a case where it is determined in the determination process of step S236 that the broadcast signal of the ISDB-T scheme is not being received ("NO" in S236), the process proceeds to step S239 and the processes of steps S239 and S240 are executed.

That is, the TMCC demodulation unit 212 supplies a signal for switching to input from the ISDB-T demodulation unit 213 as a signal switching control signal for the signal switching unit 215 (S239). Furthermore, the TMCC demodulation unit 212 turns off the power supply control signal #1 for the next-generation terrestrial broadcast demodulation unit 214, that is, supplies an L-level signal (S240).

As described, in a case where the 4-bit value of bits $B_{111}$ to $B_{114}$ is '0000' and the broadcast signal of the ISDB-T scheme is not being received, since the ISDB-T demodulation unit 213 has been started (S235) together with the next-generation terrestrial broadcast demodulation unit 214, switching to the output signal from the ISDB-T demodulation unit 213 is performed and the next-generation terrestrial broadcast demodulation unit 214 is stopped.

If the process of step S238 or S240 is completed, processing is stopped until the next TMCC information is acquired. Then, in a case where the next TMCC information is acquired, the process illustrated in FIG. 10 is executed again.

Note that in a case where it is determined in the determination process of step S232 that the 4-bit value of bits $B_{111}$ to $B_{114}$ is '1111', that is, a normal value, processing is stopped until the next TMCC information is acquired. Then, in a case where the next TMCC information is acquired, the process illustrated in FIG. 10 is executed again.

The flow of receiving processing has been described above.

2. Modifications (Examples of Other Broadcasting Schemes)

In the above description, the ISDB-T scheme has been described as a broadcasting scheme for digital terrestrial television broadcasting; however, the present technology may be applied to another broadcasting scheme. Furthermore, for example, the present technology may be applied not only to ground wave (terrestrial broadcasting) but to a broadcasting scheme such as satellite broadcasting using a broadcasting satellite (BS) or a communications satellite (CS), wire broadcasting using a cable (Common Antenna TeleVision (CATV)), or the like.

(Other Configurations of Receiving Device)

Furthermore, in the above description, a description has been given in which the receiving device 20 (FIG. 1) is configured as a fixed receiver such as a television receiver and a set top box (STB); however, the fixed receiver may be, for example, an electronic device such as a recorder, a game console, a personal computer, a network storage, or the like. Moreover, the receiving device 20 (FIG. 1) is not limited to a fixed receiver, and may be, for example, an electronic device such as a mobile receiver such as a smartphone, a mobile phone, or a tablet computer, an in-vehicle device mounted on a vehicle such as an in-vehicle television, a wearable computer such as a head mounted display (HMD), or the like.

Moreover, the transmitting device 10 having the configuration illustrated in FIG. 6 may be regarded as a modulation device or a modulation unit (for example, a modulation circuit). Similarly, the receiving device 20 having the configuration illustrated in FIG. 7 may be regarded as a demodulation device or a demodulation unit (for example, a demodulation circuit or a demodulation IC).

(Configuration including Communication Line)

Furthermore, in the transmission system 1 (FIG. 1), although not illustrated, it is also possible that various servers are connected to a communication line such as the Internet so that the receiving device 20 (FIG. 1) having a communication function can receive various data such as content or an application by accessing the various servers via the communication line such as the Internet and performing two-way communication.

(Others)

Note that terms used in the present disclosure are examples, and use of other terms is not intentionally excluded. For example, in the above description, a frame may be replaced with another term such as a packet.

Furthermore, in the present disclosure, the "2K video" is video corresponding to a screen resolution of about 1920× 1080 pixels, and the "4K video" is video corresponding to a screen resolution of about 3840×2160 pixels. Furthermore, in the above description, as broadcast content, 2K content of 2K video transmitted by the existing broadcasting scheme (existing scheme) and 4K content of 4K video transmitted by the new broadcasting scheme (new scheme) have been explained. However, broadcast content transmitted by the new scheme may be higher-definition content such as 8K video. It is noted that the "8K video" is video corresponding to a screen resolution of about 7680×4320 pixels.

3. Configuration of Computer

Figure 11:
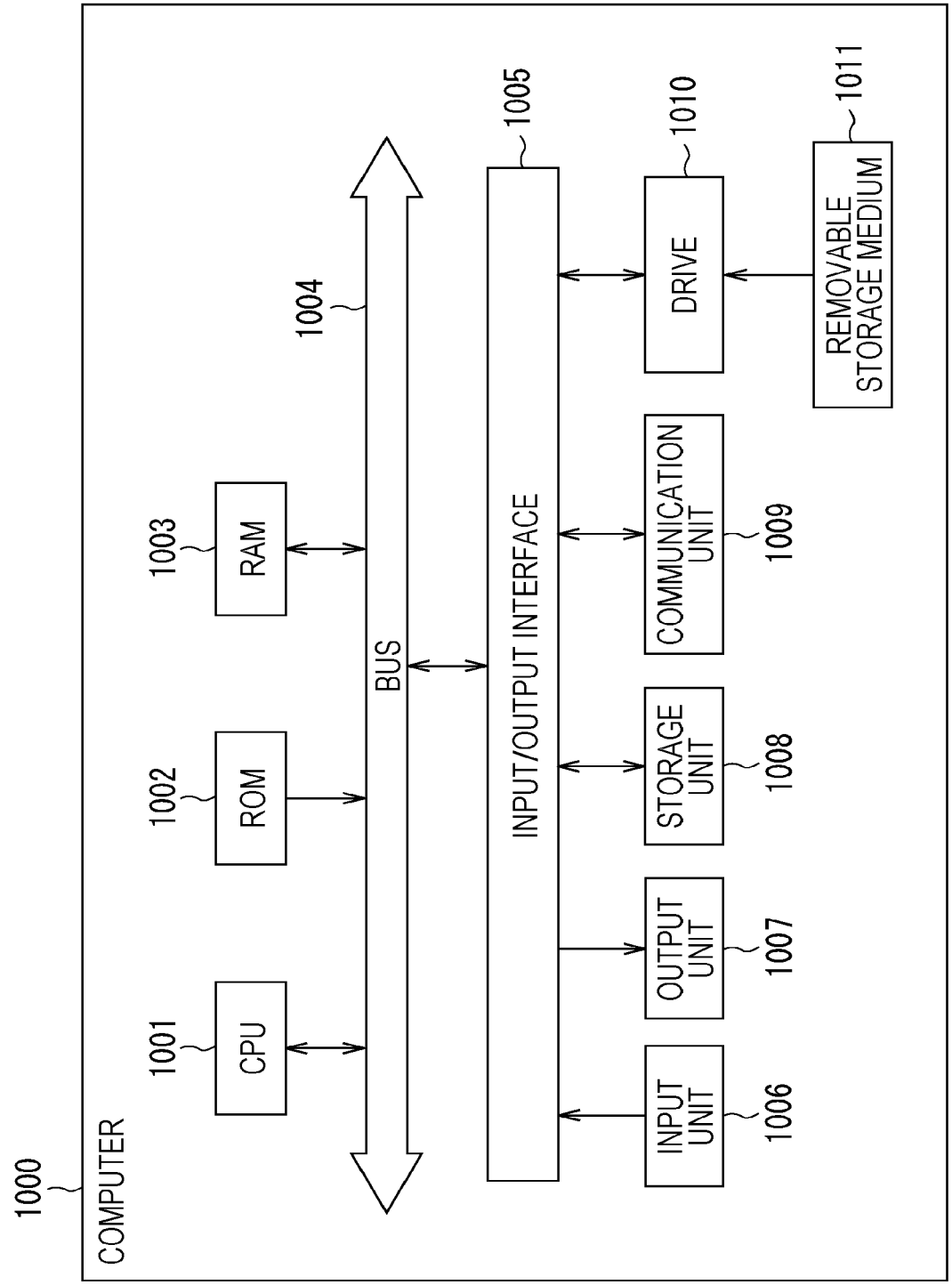
FIG. 11 is a diagram illustrating a configuration example of a computer.

The series of processes described above can be performed by hardware or can be performed by software. In a case where the series of processes are performed by software, a program that configures the software is installed on a computer. FIG. 11 is a diagram illustrating a configuration example of hardware of a computer that executes the series of processes described above according to a program.

In a computer 1000, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The storage unit 1008 includes a hard disk, a non-volatile memory, or the like. The communication unit 1009 includes a network interface or the like. The drive 1010 drives a removable storage medium 1011 such as a magnetic disk, an optical disk, a magneto-optical disk, or a semiconductor memory.

In the computer 1000 configured as described above, for example, the CPU 1001 loads the program stored in the ROM 1002 or the storage unit 1008 into the RAM 1003 via the input/output interface 1005 and the bus 1004 and executes the program, and thus the above-described series of processes are performed.

The program executed by the computer 1000 (CPU 1001) can be provided by being stored in, for example, the removable storage medium 1011 as a package medium or the like. Furthermore, the program can be provided via a wired or wireless transmission medium such as a local area network, the Internet, or digital satellite broadcasting.

In the computer 1000, the program can be installed into the storage unit 1008 via the input/output interface 1005 by inserting the removable storage medium 1011 into the drive 1010. Furthermore, the program can be received by the communication unit 1009 via a wired or wireless transmission medium and can be installed in the storage unit 1008. In addition, the program can be installed in advance into the ROM 1002 or the storage unit 1008.

Here, in the present Description, the processes performed by the computer according to the program do not necessarily have to be performed in time series in the order described as the flowcharts. That is, the processes performed by the computer according to the program also include processes executed in parallel or individually (for example, parallel processing or processing by an object). Furthermore, the program may be processed by one computer (processor) or may be subjected to distributed processing by a plurality of computers.

Note that the embodiments of the present technology are not limited to the above-described embodiments, and various modifications can be made without departing from the scope of the present technology.

Furthermore, the present technology can also be configured as follows.

(1)
A receiving device including:
a receiving unit that receives a transmission frame transmitted from a transmitting device; and
a demodulation unit that performs demodulation processing on a data signal obtained from the transmission frame that has been received, on the basis of a transmission control signal obtained from the transmission frame that has been received,
in which the transmission control signal includes time-division control information regarding time-division control, as control information according to introduction of a second scheme compatible with a first scheme, and
the demodulation unit operates according to the time-division control information.

(2)
The receiving device according to the (1), in which the time-division control information includes information for each unit of the transmission frame.

(3)
The receiving device according to the (1) or (2), in which the time-division control information includes information regarding an index upon switching from the first scheme to the second scheme.

(4)
The receiving device according to the (3), in which the index includes information regarding a number of the transmission frames until switching from the first scheme to the second scheme.

(5)
The receiving device according to the (1),
in which the demodulation unit includes
a first demodulation unit compliant with the first scheme and
a second demodulation unit compliant with the second scheme, and
the first demodulation unit and the second demodulation unit are switched according to the time-division control information.

(6)
The receiving device according to the (5), in which power supply to the first demodulation unit and the power supply to the second demodulation unit are controlled according to the time-division control information.

(7)
The receiving device according to the (5) or (6), further including a signal switching unit that switches between a first output signal output from the first demodulation unit and a second output signal output from the second demodulation unit,
in which the signal switching unit operates according to the time-division control information.

(8)
The receiving device according to the (7),
in which the time-division control information includes information for each unit of the transmission frame, the information regarding a number of the transmission frames until switching from the first scheme to the second scheme,
upon switching from the first scheme to the second scheme,
the first demodulation unit and the second demodulation unit operate simultaneously until the number of transmission frames indicates switching from the first scheme to the second scheme, and
when the number of transmission frames indicates the switching from the first scheme to the second scheme, the signal switching unit switches output from the first output signal to the second output signal, and the first demodulation unit stops operating.

(9)
The receiving device according to any one of the (1) to (8),
in which the first scheme includes an ISDB-T scheme,
a second scheme includes a next-generation scheme of the ISDB-T scheme,
the transmission frame includes an OFDM frame, and
the transmission control signal includes a TMCC signal.

(10)

A receiving method including by a receiving device including a receiving unit that receives a transmission frame transmitted from a transmitting device and a demodulation unit that performs demodulation processing on a data signal obtained from the transmission frame that has been received, on the basis of a transmission control signal obtained from the transmission frame that has been received, controlling the demodulation unit on the basis of time-division control information included in the transmission control signal, the time-division control information regarding time-division control as control information according to introduction of a second scheme compatible with a first scheme.

(11)

A transmitting device including:

a generation unit that generates a transmission control signal including time-division control information regarding time-division control, as control information according to introduction of a second scheme compatible with a first scheme; and a transmitting unit that transmits a transmission frame including the transmission control signal that has been generated.

(12)

The transmitting device according to the (11), in which the time-division control information includes information for each unit of the transmission frame.

(13)

The transmitting device according to the (11) or (12), in which the time-division control information includes information regarding an index upon switching from the first scheme to the second scheme.

(14)

The transmitting device according to the (13), in which the index includes information regarding a number of the transmission frames until switching from the first scheme to the second scheme.

(15)

The transmitting device according to any one of the (11) to (14), in which the first scheme includes an ISDB-T scheme, a second scheme includes a next-generation scheme of the ISDB-T scheme, the transmission frame includes an OFDM frame, and the transmission control signal includes a TMCC signal.

(16)

A transmitting method including:

by a transmitting device, generating a transmission control signal including time-division control information regarding time-division control, as control information according to introduction of a second scheme compatible with a first scheme; and by the transmitting device, transmitting a transmission frame including the transmission control signal that has been generated.

REFERENCE SIGNS LIST

1 Transmission system
10 Transmitting device
11, 11-1 to 11-N Data processing device
20, 20-1 to 20-M Receiving device
20D Dual-scheme receiving device
20L Existing-scheme receiving device
20N New-scheme receiving device
111 Signal processing unit
112 TMCC signal generation unit
113 OFDM modulation unit
211 Tuner unit
212 TMCC demodulation unit
213 ISDB-T demodulation unit
214 Next-generation terrestrial broadcast demodulation unit
215 Signal switching unit
1000 Computer
1001 CPU

The invention claimed is:

1. A receiving device comprising:
 a receiving unit that receives a transmission frame transmitted from a transmitting device; and
 a demodulation unit that performs demodulation processing on a data signal obtained from the transmission frame that has been received, on a basis of a transmission control signal obtained from the transmission frame that has been received,
 wherein the transmission control signal includes time-division control information regarding time-division control as control information according to introduction of a second scheme compatible with a first scheme,
 the demodulation unit operates according to the time-division control information,
 the first scheme includes an integrated services digital broadcasting-terrestrial (ISDB-T) scheme,
 the second scheme includes a next-generation scheme of the ISBD-T scheme,
 the transmission frame includes an orthogonal frequency division multiplexing (OFDM) frame, and
 the transmission control signal includes a transmission and multiplexing configuration control (TMCC) signal,
 wherein the time-division control information includes information for each unit of the transmission frame.

2. The receiving device according to claim 1, wherein the time-division control information includes information regarding an index upon switching from the first scheme to the second scheme.

3. The receiving device according to claim 2, wherein the index includes information regarding a number of the transmission frames until switching from the first scheme to the second scheme.

4. The receiving device according to claim 1,
 wherein the demodulation unit includes
 a first demodulation unit compliant with the first scheme and
 a second demodulation unit compliant with the second scheme, and
 the first demodulation unit and the second demodulation unit are switched according to the time-division control information.

5. The receiving device according to claim 4, wherein power supply to the first demodulation unit and power supply to the second demodulation unit are controlled according to the time-division control information.

6. The receiving device according to claim 4, further comprising a signal switching unit that switches between a first output signal output from the first demodulation unit and a second output signal output from the second demodulation unit,
 wherein the signal switching unit operates according to the time-division control information.

7. The receiving device according to claim 6,
 wherein the time-division control information includes information for each unit of the transmission frame, the information regarding a number of the transmission frames until switching from the first scheme to the second scheme, upon switching from the first scheme to the second scheme, the first demodulation unit and the second demodulation unit operate simultaneously until the number of transmission frames indicates switching from the first scheme to the second scheme, and when the number of transmission frames indicates the switching from the first scheme to the second scheme, the signal switching unit switches output from the first output signal to the second output signal, and the first demodulation unit stops operating.

8. A receiving method comprising, by a receiving device including a receiving unit that receives a transmission frame transmitted from a transmitting device and a demodulation unit that performs demodulation processing on a data signal obtained from the transmission frame that has been received, on a basis of a transmission control signal obtained from the transmission frame that has been received, controlling the demodulation unit on a basis of time-division control information included in the transmission control signal, the time-division control information regarding time-division control as control information according to introduction of a second scheme compatible with a first scheme, wherein the first scheme includes an integrated services digital broadcasting-terrestrial (ISDB-T) scheme, the second scheme includes a next-generation scheme of the ISDB-T scheme, the transmission frame includes an orthogonal frequency division multiplexing (OFDM) frame, and the transmission control signal includes a transmission and multiplexing configuration control (TMCC) signal, wherein the time-division control information includes information for each unit of the transmission frame.

9. A transmitting device comprising:

a generation unit that generates a transmission control signal including time-division control information regarding time-division control as control information according to introduction of a second scheme compatible with a first scheme; and a transmitting unit that transmits a transmission frame including the transmission control signal that has been generated, wherein the first scheme includes an integrated services digital broadcasting-terrestrial (ISDB-T) scheme, the second scheme includes a next-generation of the ISDB-T scheme, the transmission frame includes an orthogonal frequency division multiplexing (OFDM) frame, and the transmission control signal includes a transmission and multiplexing configuration control (TMCC) signal, wherein the time-division control information includes information for each unit of the transmission frame.

10. The transmitting device according to claim 9, wherein the time-division control information includes information regarding an index upon switching from the first scheme to the second scheme.

11. The transmitting device according to claim 10, wherein the index includes information regarding a number of the transmission frames until switching from the first scheme to the second scheme.

12. A transmitting method comprising:

by a transmitting device, generating a transmission control signal including time-division control information regarding time-division control as control information according to introduction of a second scheme compatible with a first scheme; and by the transmitting device, transmitting a transmission frame including the transmission control signal that has been generated, wherein the first scheme includes an integrated services digital broadcasting-terrestrial (ISDB-T) scheme, the second scheme includes a next-generation scheme of the ISDB-T scheme, the transmission frame includes an orthogonal frequency division multiplexing (OFDM) frame, and the transmission control signal includes a transmission and multiplexing configuration control (TMCC) signal, wherein the time-division control information includes information for each unit of the transmission frame.

* * * * *